(12) United States Patent
Wobak et al.

(10) Patent No.: US 12,506,348 B2
(45) Date of Patent: Dec. 23, 2025

(54) RADIO FREQUENCY TRANSACTION WITH A MOBILE DEVICE HAVING A DEPLETED BATTERY

(71) Applicant: NXP B.V., Eindhoven (NL)

(72) Inventors: Markus Wobak, Kumberg (AT); Ulrich Andreas Muehlmann, Graz (AT)

(73) Assignee: NXP B.V., Eindhoven (NL)

( * ) Notice: Subject to any disclaimer, the term of this patent is extended or adjusted under 35 U.S.C. 154(b) by 111 days.

(21) Appl. No.: 18/347,761

(22) Filed: Jul. 6, 2023

(65) Prior Publication Data

US 2025/0015619 A1 Jan. 9, 2025

(51) Int. Cl.
| | | |
|---|---|---|
| H02J 7/00 | (2006.01) | |
| E05B 81/76 | (2014.01) | |
| H02J 7/34 | (2006.01) | |
| H02J 50/20 | (2016.01) | |

(52) U.S. Cl.
CPC ............ *H02J 7/0048* (2020.01); *E05B 81/77* (2013.01); *H02J 7/00712* (2020.01); *H02J 7/345* (2013.01); *H02J 50/20* (2016.02)

(58) Field of Classification Search
CPC ...... H02J 7/0048; H02J 50/20; H02J 7/00712; H02J 7/345; E05B 81/77
USPC .................................................. 307/9.1, 104
See application file for complete search history.

(56) References Cited

U.S. PATENT DOCUMENTS

| | | |
|---|---|---|
| 9,752,371 B2 | 9/2017 | Seo et al. |
| 9,995,061 B2 | 6/2018 | Ishikawa et al. |
| 10,312,721 B2 * | 6/2019 | Orris .................. G07C 9/00896 |
| 10,361,474 B2 | 7/2019 | Ding et al. |
| 10,992,504 B2 | 4/2021 | Zoescher et al. |
| 2008/0100263 A1 | 5/2008 | Nagatsuka et al. |
| 2017/0050618 A1 | 2/2017 | Lickfelt et al. |
| 2017/0061714 A1 * | 3/2017 | Odejerte, Jr. ...... G07C 9/00571 |
| 2018/0342888 A1 * | 11/2018 | Miraglia ................. H02J 50/00 |

(Continued)

FOREIGN PATENT DOCUMENTS

| | | |
|---|---|---|
| CN | 109972916 A | 7/2019 |
| EP | 4030630 A1 | 7/2022 |

OTHER PUBLICATIONS

Daskalakis, Spyridon Nektarios et al.; "NFC Hybrid Harvester for Battery-free Agricultural Sensor Nodes"; 2019 IEEE International Conference on RFID Technology and Applications (RFID-TA); Sep. 25-27, 2019, Pisa, Italy; DOI: 10.1109/RFID-TA.2019.8892237.

(Continued)

*Primary Examiner* — Michael R. Fin
(74) *Attorney, Agent, or Firm* — Dan D. Hill

(57) ABSTRACT

For a mobile device having a main battery and a backup power source, a method is provided for wirelessly charging the backup power source using a reader when the main battery of the mobile device is fully depleted and unable to provide enough power for an RF transaction. The reader detects the mobile device cannot perform the RF transaction. In response, the reader generates an RF field that provides charge for the backup power source of the mobile device. After charging is complete, the mobile device performs the RF transaction using the charged backup power source. In one embodiment the mobile device is a mobile phone being used as a digital key and the reader is implemented in a smart door handle of an automobile that is unlocked by the RF transaction.

7 Claims, 3 Drawing Sheets

(56) References Cited

U.S. PATENT DOCUMENTS

2018/0351388 A1 12/2018 Orris et al.
2019/0202401 A1 7/2019 Lee

OTHER PUBLICATIONS

Masson, John et al.; "NFC Energy harvesting Booster Pack; Power the MSP432 Launchpad, harvest energy, and collect sensor data—all with your phone's near field communication"; Published Aug. 3, 2015 Hackster.io.
Passive Blog Components; "TDK's Thin EDLC for IC Smart Cards"; Oct. 7, 2016; https://passive-components.eu/tdks-thin-edlc-for-ic-smart-cards/.
Seiko Instruments Inc. Datasheet "Chip Capacitors CPH3225A"; https://www.sii.co.jp/en/me/datasheets/micro-battery/chip-capacitor/cph3225a/; Retrieved from the Internet Jul. 5, 2023.
Wong, Dr. Adrian; Techarp "The Ultimate Galaxy Note9 S Pen Features + Tips Guide; What You Don't Know About the Note9 S Pen, Recommended Reading"; Posted Oct. 4, 2018; https://www.techarp.com/mobile/galaxy-note9-s-pen-guide/2/.
U.S. Appl. No. 17/691,619; Inventor Johannes Stahl, et al.; "Near Field Communication-Based Method and System for State or Event Detection or Classification;", filed Mar. 10, 2022.

* cited by examiner

RADIO FREQUENCY TRANSACTION WITH A MOBILE DEVICE HAVING A DEPLETED BATTERY

BACKGROUND

Field

This disclosure relates generally to electronic circuits, and more particularly, to a radio frequency (RF) transaction with a mobile device having a depleted battery.

Related Art

The use of a mobile device, such as a smart phone, to operate door locks on an automobile and even to start the engine is becoming more common. This can be convenient in case the key fob for the car is not at hand. However, mobile phones are depended upon for many things and can easily run out of power without frequent recharging. Consequently, if the mobile phone's battery is dead, the user cannot access the car with the mobile phone.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
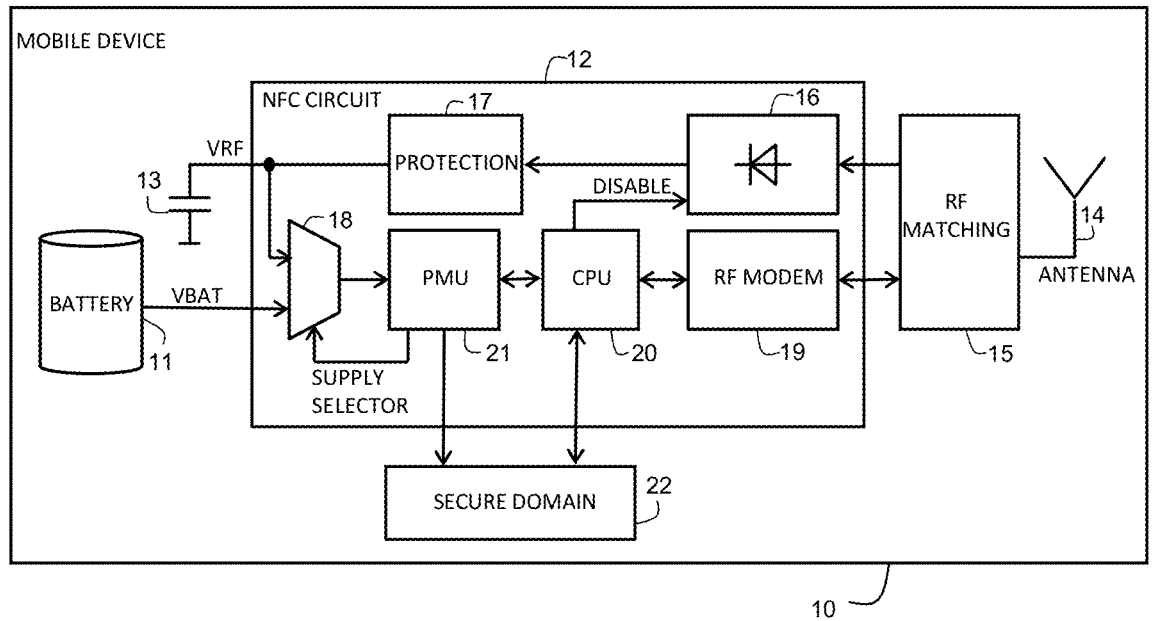
FIG. 1 illustrates a mobile device in accordance with an embodiment.

Normally, an RF transaction between a mobile phone and another device is not possible when the mobile phone has a depleted battery. For example, the mobile phone, when used as a digital key, will not be able to unlock a car door when the mobile phone has a depleted battery. An RF transaction to unlock a car door requires relatively high power demand. For example, power is needed to operate an RF modem to communicate with another device, power for a central processing unit (CPU), and power to execute an authentication application within a secure domain. Also, mobile devices do not usually feature optimized antennas for energy reception from an RF field, such as may be produced by a card reader communicating using near field communication (NFC). Therefore, the received RF power level that the mobile device would be capable of is relatively low due to very low antenna coupling between the mobile device and, e.g., a reader terminal. Consequently, powering the mobile device using an RF field generated by another device is not realistic for a mobile device used as a digital key because the low antenna coupling plus the high power requirement to execute, for example, authentication algorithms.

According to an embodiment, the low received RF power limitation of a wireless power transfer that uses an RF field is overcome by including a backup power source in the mobile device. An RF field generated by a reader is used to charge the backup power source, which may be a short-term energy buffer like a super-capacitor. When a main battery of the mobile device is depleted, the backup power source is charged before performing the actual RF transaction, such as using a digital key to unlock a car door. The short-term energy buffer may be charged for a predetermined time which may be several times longer than the duration of the RF transaction.

The short-term backup power source is sized to store enough energy for long enough to operate circuits in the mobile phone such as for performing the RF transaction using NFC or ultra-wideband (UWB). In one embodiment, the RF transaction may include a user/owner authentication and access to a car, and maybe even include starting the car. A reader is provided in the car that includes a detector. The detector is able to detect that the mobile phone cannot perform the RF transaction and provide an RF field to charge the backup power source of the mobile device. In one embodiment, the reader may be implemented in the car as part of a smart door handle. Smart door handles are commonly available in cars and allow a user to lock or unlock a car with only a touch when the car's key fob is within range. Some smart door handles also allow a mobile device with a digital key to unlock the car. According to an embodiment, with only the charge available in the charged backup power source, the mobile device is able to perform the RF transaction with a reader included in the smart door handle. Note that terms car, automobile, and vehicle will be used interchangeably and mean the same for purposes of this description.

In accordance with an embodiment, there is provided, a method including: detecting, by a reader device, a mobile device is within a radio frequency (RF) field generated by the reader device; detecting, by the reader device, a main battery of the mobile device is depleted; charging, by the reader device, a backup power source of the mobile device using the generated RF field; ending the charging by the reader device; and performing a RF transaction with the mobile device using the charged backup power source to provide power. The charging may end after a predetermined time period. The RF transaction may include performing an authentication procedure with the mobile device. The detecting may further include the reader device detecting a user action as an indication to begin the charging of the backup power source. The reader device may be implemented in a smart door handle of an automobile and the detecting may further include the reader device detecting the user touching the smart door handle as an indication to begin the charging of the backup power source. The detecting may further include the reader device detecting a change in the RF field as an indication to begin the charging. The detecting may further include communicating a command/response sequence between the reader device and a RF tag associated with the mobile device. The RF field may be provided according to a near field communication (NFC) protocol.

In another embodiment, there is provided, a reader device, including: a wireless charging circuit coupled to an antenna, the wireless charging circuit configured to wirelessly charge a backup power source in a mobile device using an RF field; a detector configured to detect the mobile device has a depleted main battery and to signal to the NFC wireless charging circuit to charge the backup power source; a central processing unit (CPU) configured to signal when to end charging of the backup power source in the mobile device; and a RF modem configured to facilitate performing a transaction with the mobile device using the charged backup power source. The reader device may be implemented on one or more integrated circuits. The RF field may be provided according to a near field communication (NFC) protocol. The reader device may be implemented in a smart door handle of an automobile. The backup power source may include a super capacitor. The CPU may signal to halt charging a predetermined time period after the charging was begun.

In yet another embodiment, there is provided, a mobile device including: a wireless charging circuit, coupled to an antenna, for receiving a radio frequency (RF) field from a reader device for charging a backup power source in response to a main battery of the mobile device being depleted and unable to power the mobile device sufficiently for the mobile device to perform a RF transaction; a power management unit (PMU) configured to manage power of the mobile device; a selection circuit coupled to the backup power source and to the main battery, the selection circuit configured to select the backup power source to send power to the PMU of the mobile device after the backup power source is charged; and a secure domain configured to perform at least a portion of the RF transaction with power provided by the backup power source. The backup power source may include a super capacitor. The selection circuit may be configured to receive a selection signal from the PMU to select the backup power source in response to the PMU determining that the backup power source is charged. The RF field may be provided according to a near field communication (NFC) protocol. The secure domain may perform the RF transaction using a ultra-wideband (UWB) protocol. The secure domain may be configured to perform an authentication procedure with the reader device using the charged backup power source.

FIG. 1 illustrates mobile device 10 in accordance with an embodiment. Mobile device 10 includes main battery 11, NFC circuit 12, backup power source 13, antenna 14, and secure domain 22. NFC circuit 12 includes RF matching circuit 15, rectifier circuit 16, protection circuit 17, power supply selection circuit 18, power management unit (PMU) 21, CPU 20, and RF modem 19. NFC circuit 12 may be implemented on one or more integrated circuits. Power supply selection circuit 18 is illustrated as a multiplexer. The short-term energy buffer 13 may be a super capacitor. A so called super capacitor is capable of storing more charge per unit volume than a conventional electrolytic capacitor. Secure domain 22 may be, e.g., a secure element. NFC circuit 12 is unsecure and secure domain 22 is provided in mobile device 10 to process a secure application such as door access, payment, and ticketing. Secure domain 22 may be a secure element that is found in many mobile phones.

Mobile device 10 is normally powered by battery 11, which is the main battery for powering mobile device 10. If battery 11 is depleted, mobile device 10 will no longer function. If mobile device 10 is being depended upon for access to an automobile, and mobile device 10 has a fully depleted battery, another way to unlock the car using mobile device 10 is provided. According to an embodiment, power is provided by a reader via an RF field to wirelessly charge backup power source 13 prior to the actual RF transaction. Thus, even if main battery 11 is depleted, passive rectifier block 16 feeds received RF energy into backup power source 13, which may be a super capacitor. In one embodiment, the super capacitor is sized to store between 1-50 mF (microfarad) capacitance depending on the power needed by the mobile device 10 to perform the transaction. A target voltage level at a node labeled VRF may be between 3 and 4 volts. Protection circuit 17 prevents excess energy from harming NFC circuit 12. Protection circuit 17 may be, e.g., a limiter circuit such as found in RFID tags.

During normal usage of mobile device 10, power supply source selector 18 supplies PMU 21 with power from external main battery 11 if a battery supply voltage labeled VBAT is above a minimum voltage level. For typical Li-Ion based batteries with an operational voltage of 3.3 to 4.2 volts, a threshold voltage for battery 11 may be set between 2.5 and 3 volts. If battery voltage VBAT is too low to support normal operation and cannot provide enough energy to perform an RF transaction, mobile device 10 can be positioned within an RF field of reader 30. After the detection of the external RF field from reader 30, energy is transferred to backup power source 13. NFC circuit 12 and antenna 14 receive the RF field from reader 30 and provide the charge to backup power source 13. In one embodiment, backup power source 13 is charged for a predetermined time and then halted. There are also other ways to determine when backup power source 13 is sufficiently charged. When a voltage level of backup power source 13 is high enough, an internal reset is first performed in mobile device 10. When voltage VRF is detected by PMU 21 to be larger than a configurable threshold voltage associated with a sufficient charge for the RF transaction, PMU 21 sends supply selection signal SUPPLY SELECTION to supply selector 18 to select voltage VRF 13 to power mobile device 10 for the RF transaction. Note that during normal operation of mobile device 10, CPU 20 can disable rectifier 16 by asserting a signal labeled DISABLE to prevent rectifier 16 from impacting operation of RF modem 19 during an RF transaction using main battery 11 as the power source. Note also that the supply source selector 18 can be placed within the NFC circuit 12 as shown, or outside of NFC circuit 12.

Figure 2:
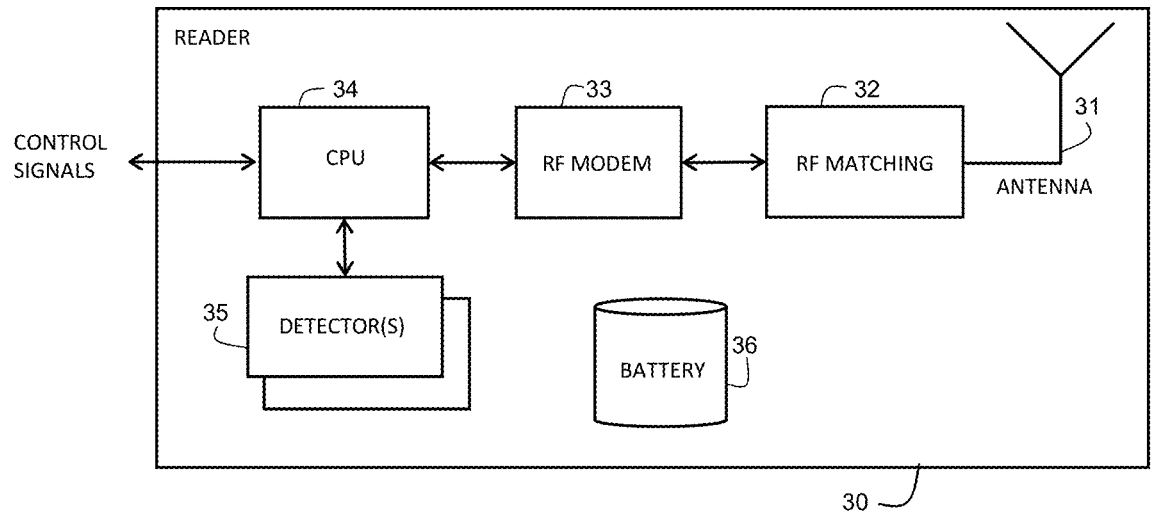
FIG. 2 illustrates a reader for communicating with the mobile device in accordance with an embodiment.
Figure 3:
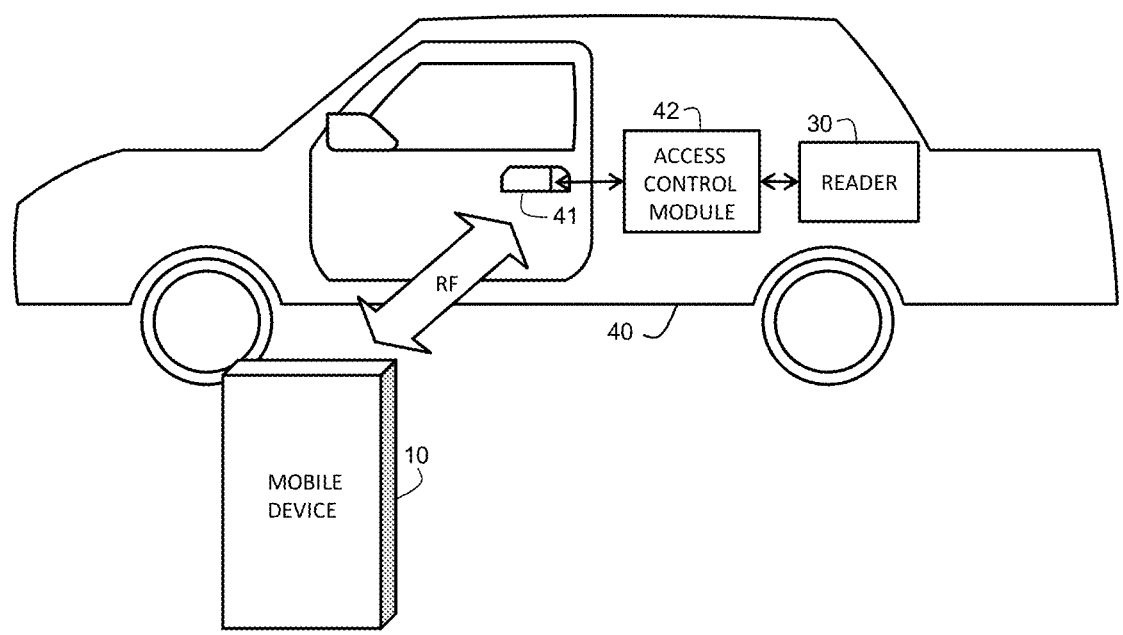
FIG. 3 illustrates an automobile and a mobile device in accordance with an embodiment.

FIG. 2 illustrates reader device 30 in accordance with an embodiment. Reader device 30 may be implemented in one or more integrated circuits. Reader device 30 includes antennal 31, RF matching circuit 32, RF modem 33, CPU 34, detector(s) 35, and battery 36. The various circuits of reader 30 are connected to receive power from battery 36. However, to simply the drawing, the connections are not illustrated in FIG. 2. Battery 36 may be, for example, the automobile battery when used in an automobile as described. RF modem 32 is coupled to antenna 31 to provide two-way communication and battery charging capability. RF matching circuit 32, RF modem 33, and antenna 31 form a wireless charging circuit that can provide a battery charge and/or communicate with another device having an antenna (e.g., antenna 14 in FIG. 1) positioned proximate to antenna 31. For example, reader 30 may provide charge to backup power source 13 when mobile device 10 is within range. In one embodiment, the RF field is provided according to a near field communication (NFC) protocol. One or more of detectors 35 may be provided in a car to detect when mobile device 10 has a depleted battery 11 and to signal the wireless charging circuit to provide a charge to backup power source 13. Reader 30 may be implemented in one or more smart door handles as illustrated in FIG. 3. In case multiple detectors are present, such as an automobile with multiple smart door handles, it is sufficient that only one detector is triggered, and a logical result from detectors 35 will be ORed using a logical OR gate (not shown). CPU 34 may signal to end charging of backup power source 13 according to a predetermined criteria. For example, CPU 34 may end charging a predetermined time after charging was begun.

Also, CPU 34 may be used in the RF transaction with mobile device 10 and may communicate, for example, one or more control signals labeled CONTROL SIGNALS for facilitating the RF transaction with additional circuits not shown in FIG. 2. One example of an additional circuit receiving the control signals from CPU 34 is a car door access control module 42 shown in FIG. 3.

There are several ways for detector 35 of reader device 30 to proceed into a backup charging mode with mobile device 10. For example, a user action such as holding the car's door handle with mobile device 10 within range of reader 30 for a defined time, or pushing a button on the automobile for a defined time may be used to trigger a backup charging mode to charge backup power source 13. Another way to detect when backup charging mode is needed may be through passive detection of when presented mobile device 10 is within range of reader 30 such as used for RFID tag detection. Also, a backup power source charging mode may be entered using an active detection algorithm of the presented mobile device. The active detection algorithm may require the addition of a passive RFID tag hardware block (not shown) in NFC circuit 12 that would be used for communication without use of a powered up CPU 20. Limited LMA (load modulation amplitude) capability may be provided in this manner to allow a command/response type of communication between reader 30 and the passive RFID tag. Additionally, if an RF transaction between the mobile device 10 and reader 30 fails a defined number of repetitions, the backup charging mode may be entered to charge backup power source 13.

FIG. 3 illustrates an RF transaction between automobile 40 and mobile device 10 of FIG. 1 in accordance with an embodiment. Automobile 40 includes smart door handle 41, access control module 42, and reader 30 (FIG. 2). Reader device 30 may be included within car door lock handle 41. Mobile device 10 may be a battery powered smart phone having a digitized car key application and NFC circuit 12 as shown in FIG. 1. Access control module 42 controls the locking and unlocking of smart door handle 41 in response to receiving a control signal from reader 30. Mobile device 10 is configured to communicate with smart door handle 41 wirelessly through reader 30 using one or both of NFC and UWB communication protocols.

A door lock or other feature of automobile 40 may be operated using mobile device 10 and smart door handle 41 even when mobile device 10 lacks sufficient battery charge to perform an RF transaction. As described above in the discussion of FIG. 1 and FIG. 2, one or more detector(s) 35 of reader 30 provides a trigger to signal a need for charging backup power source 13 in mobile device 10. When the main battery 11 of mobile device 10 is depleted and backup power source 13 is sufficiently charged, power supply source selector 18 in mobile device 10 provides energy from backup power source 13 to perform an NFC RF transaction and to command access control module 42 to open the car door. Note that in another embodiment, the use of backup power source 13 can be extended to other battery powered mobile device applications such as payment and transit applications. Also, a transit or payment terminal may also include a detector 35 as described above so that a transit or payment transaction can be performed with a mobile device having a depleted battery.

Figure 4:
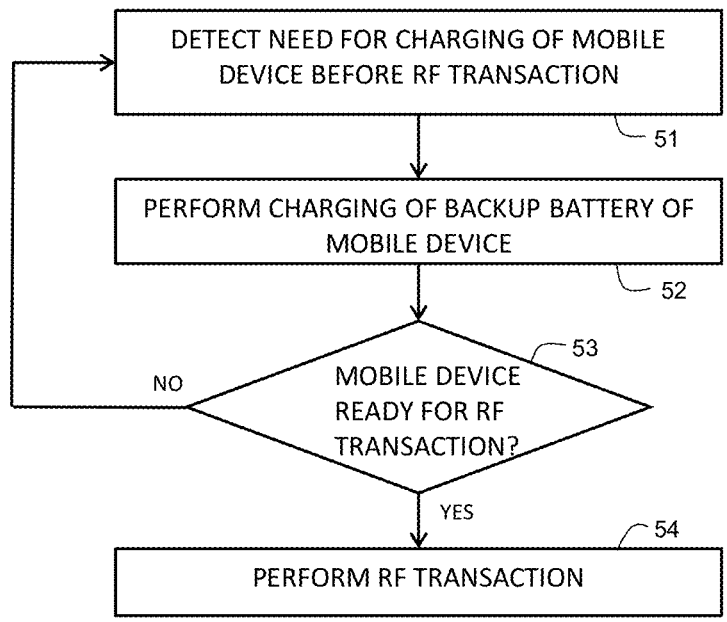
FIG. 4 illustrates a method for charging a backup power source in the mobile device of FIG. 1 in accordance with embodiment.

FIG. 4 illustrates method 50 for dynamically charging a backup battery in a mobile device, such as mobile device 10 in FIG. 1, using a reader device, such as reader 30 in FIG. 2, in accordance with an embodiment. At block 51, the reader device detects that the mobile device has a depleted main battery and requires its backup battery to be charged before performing an RF transaction such as unlocking a car door. At block 52, the backup power source of the mobile device is wirelessly charged by the reader using a generated RF field. After a predetermined time, at decision block 53, it is determined if the backup power source has been sufficiently charged for an RF transaction such as unlocking a car door. This may also be determined by the PMU of the mobile device checking the voltage level of voltage VRF. If it is determined that the mobile device is not ready for the RF transaction, the NO path is taken back to block 51 for more charging time. The required typical charge duration is related to RF coupling between the reader and the mobile device and power demand required to perform the RF transaction. The system may implement multiple charging iterations to sufficiently charge the backup power source. For example, a typical RF transaction that requires approximately 100 ms (millisecond) and 100 mA (milliampere) average supply current requires about 10 mC (millicoulomb) charge to be available prior to performing the RF transaction. Depending on retrieved charge current from the RF field, the required charge time duration can be estimated. Assuming a typical recovered current of 10 mA, a charge duration of about 1 second is required. As can be seen, the charge duration to establish sufficient charge for the RF transaction may be much longer than the actual total time a user needs to perform the RF transaction such as opening a car door, but establishes service availability even with a completely depleted battery. If at decision block 53 it is determined that the mobile device has sufficient backup power source charge to perform the RF transaction, then the YES path is taken to block 54 and the RF transaction is performed between the reader and the mobile device.

A simple implementation of the reader may wirelessly charge the backup power source for a defined time period of an RF carrier emission followed by an RF reset and then the actual RF transaction. In one embodiment, there may be no feedback to indicate sufficient power level so the RF transaction may fail if the backup power source is not sufficiently charged.

A more advanced implementation of the reader may charge the backup power source for a defined time followed by an RF reset and a short NFC RF transaction between the mobile device and the reader not involving the secure domain to estimate further power demand. Note that a transaction such as authentication using secure domain 22 (FIG. 1) may typically consume more than half of the total power required for an RF transaction. By means of in-band communication, e.g., LMA, the mobile device can inform the reader about its further power demand. If more power is needed, further charging of the backup power source is performed. If not, the RF transaction can be performed, e.g., a car can be unlocked.

In another embodiment the backup power source can be used to power an out-of-band radio, e.g., UWB to perform the actual transaction. This would mean that in case of a depleted main battery the transient backup power source is charged by means of an NFC RF field, but the transaction is performed by another subsystem, such as UWB, being powered by the transient backup power source.

Figure 5:
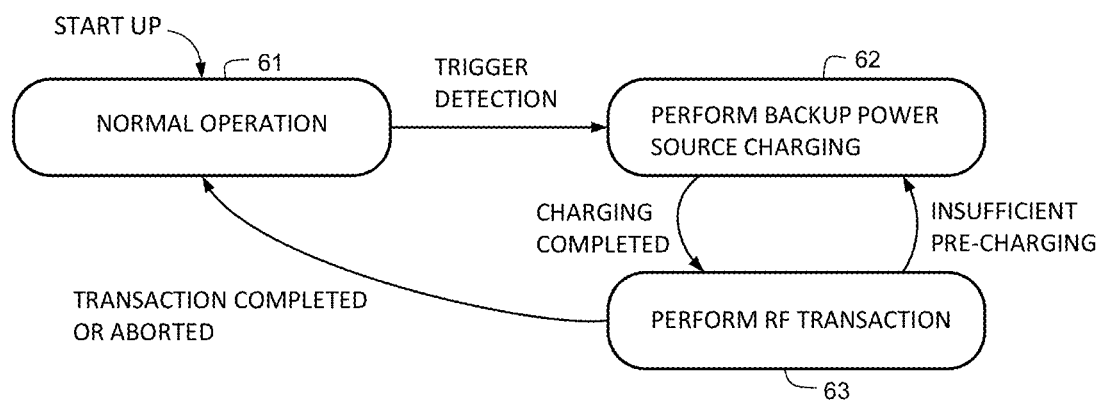
FIG. 5 illustrates a state diagram of a mode of operation selection in a reader device in accordance with an embodiment.

FIG. 5 illustrates state diagram 60 of a mode of operation selection in a reader device in accordance with an embodiment. State diagram 60 begins in normal operation mode as shown in state 61. In normal operation mode the reader device, e.g., reader device 30 in FIG. 2, detects a presence of communication counterparts. This may be done in several ways as described above, and the reader device performs an RF transaction after detection of mobile device 10.

Charging state 62 is entered when a detector of the reader device provides a trigger, indicating the mobile device is detected. In this state, the reader will perform a defined charging cycle having a configurable time period (application dependent) to charge a mobile device that has the short-term energy storage provided by backup power source 13. Once completed, reader device transitions into next state 63 to perform the RF transaction. In case charging of backup power source 13 was insufficient, another round of charging can be performed indicated in FIG. 5 by returning to state 62 from state 63. Note that an increased charging time period may be applied by reader device 30 to transfer more energy to the mobile device's backup power source 13 (FIG. 1). Once the RF transaction is successfully completed, the reader will transition back into normal operation state 61.

The described embodiment overcomes the limitation of low received RF power by charging a short-term energy buffer (like a super capacitor) for a time duration several times longer than that required for the actual RF transaction because of the very low charge rate provided by the available RF field coupling between the mobile device and the reader. The balance of charging time versus transaction duration provides a compromise that allows the transaction to be completed without the normal battery power.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements. The term "coupled," as used herein, is not intended to be limited to a direct coupling or a mechanical coupling.

What is claimed is:

1. A method comprising:
   detecting, by a reader device, a mobile device is within a radio frequency (RF) field generated by the reader device;
   detecting, by the reader device, a main battery of the mobile device is depleted;
   charging, by the reader device, a backup power source of the mobile device using the generated RF field; wherein ending the charging by the reader device;
   performing a RF transaction with the mobile device using the charged backup power source to provide power;
   wherein:
   the detecting further comprises the reader device detecting a user action as an indication to begin the charging of the backup power source; and
   the reader device is implemented in a smart door handle of an automobile and the detecting further comprises the reader device detecting the user touching the smart door handle as an indication to begin the charging of the backup power source.

2. The method of claim 1, wherein the detecting further comprises the reader device detecting a change in the RF field as an indication to begin the charging.

3. The method of claim 1, wherein the detecting further comprises communicating a command/response sequence between the reader device and a RF tag associated with the mobile device.

4. The method of claim 1, wherein the RF field is provided according to a near field communication (NFC) protocol.

5. The method of claim 1, wherein the charging ends after a predetermined time period.

6. The method of claim 1, wherein the RF transaction includes performing an authentication procedure with the mobile device.

7. The method of claim 1, wherein the detecting further comprises the reader device detecting a user action as an indication to begin the charging of the backup power source.

* * * * *